(12) United States Patent
Lawton et al.

(10) Patent No.: US 8,479,160 B2
(45) Date of Patent: Jul. 2, 2013

(54) DEBUGGING CLIENT-SIDE CODE

(75) Inventors: Craig Michael Lawton, Raleigh, NC (US); Michael Stephen Brown, Raleigh, NC (US); Sachin Pravin Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 12/582,738

(22) Filed: Oct. 21, 2009

(65) Prior Publication Data

US 2011/0093747 A1   Apr. 21, 2011

(51) Int. Cl.
*G06F 9/44*   (2006.01)
*G06F 11/00*   (2006.01)

(52) U.S. Cl.
USPC ........................................ 717/120; 714/38.11

(58) Field of Classification Search
None
See application file for complete search history.

(56) References Cited

U.S. PATENT DOCUMENTS

| 7,107,575 | B1 * | 9/2006 | Mor et al. ..................... 717/120 |
| 2005/0210004 | A1 * | 9/2005 | Focazio et al. ..................... 707/3 |
| 2008/0033900 | A1 * | 2/2008 | Zhang et al. ..................... 706/52 |
| 2009/0063418 | A1 * | 3/2009 | Robie ................................. 707/3 |
| 2009/0089751 | A1 * | 4/2009 | Raikes et al. ................. 717/120 |
| 2010/0023294 | A1 * | 1/2010 | Fan et al. ..................... 702/123 |

* cited by examiner

*Primary Examiner* — Hyun Nam
(74) *Attorney, Agent, or Firm* — Guerin & Rodriguez, LLP

(57) ABSTRACT

A method for debugging client-side code includes a client receiving an application file set from a server in response to the client requesting an application. A singleton is generated on the client by executing a script in the application file set. The singleton monitors a data event generated by an application programming interface. The singleton writes a client data record to a cache memory in response to the application programming interface generating the data event. The client data record records an application event. The singleton flushes the contents of the cached memory in response to a flush event, and transfers the contents to the server for persistent storage.

18 Claims, 7 Drawing Sheets

DEBUGGING CLIENT-SIDE CODE

FIELD OF THE INVENTION

The invention relates generally to identification of software problems. More specifically, the invention relates to identification of problems with software code and execution where the software resides on a client with limited local memory capacity.

BACKGROUND

Previously, most applications were executed on a server, which would be shared by multiple clients. The clients would interact with the server through a graphical interface. With the popularity of Web 2.0 technology, and browser pages enhanced with embedded scripting languages, such as JavaScript™, an increasing number of applications are being executed directly on the client. Most lightweight script-enhanced pages, however, do not have a software extension or "plug-in" that would facilitate writing to a memory of sufficient size, and only have access to a comparatively small cache memory. Moreover, although client-based application execution can result in applications that execute faster than if the same application is run on a server, the inability to store a sufficiently long history of application execution limits efficient debug of errant applications running on the client.

The problem of efficient debug is further exacerbated by difficulty in providing client-based data security, so the user does not access or change data that should be protected, without adding excessive software overhead. Further, flexible scripting languages like JavaScript™ complicate application debug, because the flexibility facilitates unintentional combinations of data types that can lead to errors.

BRIEF SUMMARY

In one aspect, the invention features a method for debugging client-side code comprising receiving by a client an application file set from a server in response to a request from the client for an application. A singleton is generated on the client by executing a script in the application file set received from the server. The singleton monitors a data event generated by an application programming interface file. The singleton writes a client data record to a cache memory in response to the application programming interface generating the data event. The client data record records an application event of an application on the client. The singleton flushes the contents of the cache memory in response to a flush event, and transfers the contents to the server for persistent storage thereat.

In another aspect, the invention features a method for persisting a client-side generated event comprising a client receiving a request for an application. An application file set is transmitted to the client. The application file set includes a script that, when executed on the client, causes generation of a singleton. The singleton monitors a data event produced by the execution of the application by the client.

In another aspect, the invention features a computer program product for persisting a client-side generated event. The computer program product comprises a computer readable storage medium having computer readable program code embodied therewith. The computer readable program code comprises a computer readable program code configured to receive from a client, a request for an application. The computer readable program code is configured to transmit to the client an application file set. The application file set includes a script that, when executed on the client, causes generation of a singleton that monitors data events produced by the execution of the application by the client.

In another aspect, the invention features a method for monitoring client-side code comprising receiving by a client an application file set from a server in response to a request from the client for an application. A singleton is generated on the client by executing a script in the application file set received from the server. The singleton monitors a data event generated by an application programming interface file. The singleton writes a client data record to a cache memory in response to the application programming interface generating the data event. The client data record records an application event of an application on the client.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Debugging client-side code uses a method to monitor the activity of the application code on the client, a method to store, or persist, the monitored activity on a server, and a method to recall the persisted data.

Figure 1:
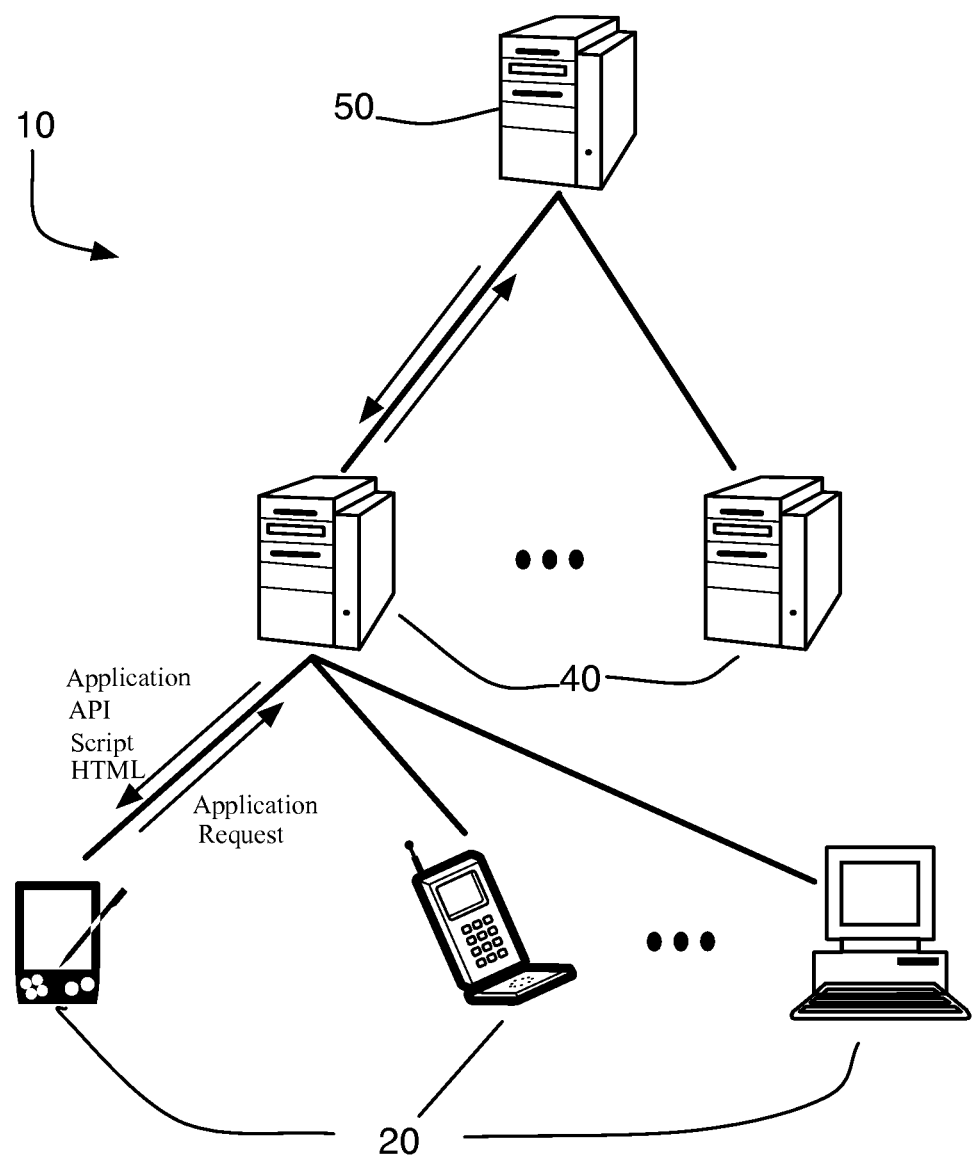
FIG. 1 is a block diagram of an embodiment of a network, including clients, application servers, and a web server.

FIG. 1 illustrates an embodiment of a network 10 for debugging client-side code. Example embodiments of the network 10 include, but are not limited to, the Internet, an intranet, a local area network (LAN), a wide area network (WAN), and a virtual private network (VPN). A plurality of clients 20 communicates with one of a plurality of servers 40. Example embodiments of a client 20 include, but are not limited to, a personal computer (PC), a Macintosh computer, a workstation, laptop computer, a mainframe computer, a hand-held device such as a personal digital assistant (PDA) and a mobile or cellular phone, a network terminal, and an online gaming device such as Microsoft's XBOX™ or Sony's PLAYSTATION™. The server 40 can be an application server, which further communicates with a web server 50.

In brief overview, a client 20 requests an application from the server 40. In response to the request, the server 40 provides an application file set to the client 20. The application file set contains the requested application and files to initiate the monitoring of the application on the client 20. The files to initiate monitoring include a script and an application programming interface (API) as shown in FIG. 1. The client 20 transfers client data records to the server 40 based on one of a variety of triggering flush events, so that the server 40 can persist the data associated with the application executing on the client 20. The client 20 can also recall the persisted data from the server 40 later, when the client wishes to review the previous execution data generated by the application running on the client 20.

Figure 2:
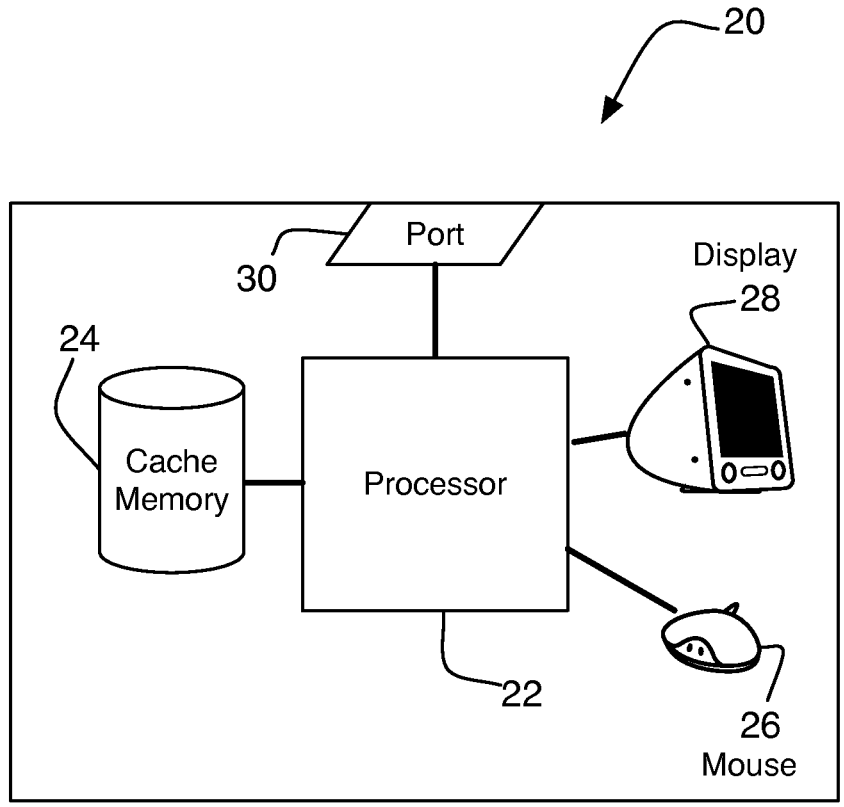
FIG. 2 is a schematic view of an embodiment of a client with a processor, a cache memory, a display, a mouse, and a port for communicating with a server.

FIG. 2 shows basic functions of one embodiment of a client 20. The client 20 includes a processor 22 operatively connected to a display 28, a mouse 26, a cache memory 24, and a port 30. The mouse 26 is an example of a peripheral device used to provide inputs to the processor 22. Other non-limiting examples of peripheral devices are a digitizing pen, and a touch screen interface. The port 30 is used to communicate with a corresponding port 46 (FIG. 3) on the server 40. The ports 30, 46 are adapted to the transmission medium connecting the two ports.

Figure 3:
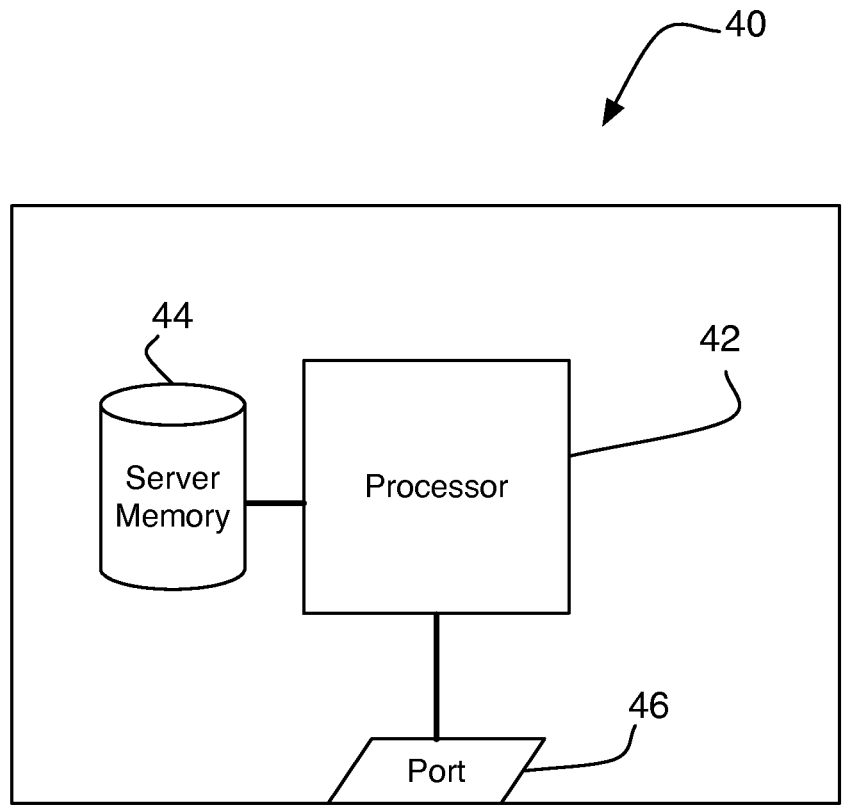
FIG. 3 is a schematic view of an embodiment of a server with a processor, server memory, and a port for communicating with another server, and a plurality of clients.

FIG. 3 shows basic functions of one embodiment of a server 40. The server 40 includes a processor 42 operatively connected to a server memory 44 and to a port 46. In the alternate embodiment, where the server 40 is an application server that is in communication with a web server 50, the port 46 also communicates with a corresponding port on the web server 50.

Figure 4:
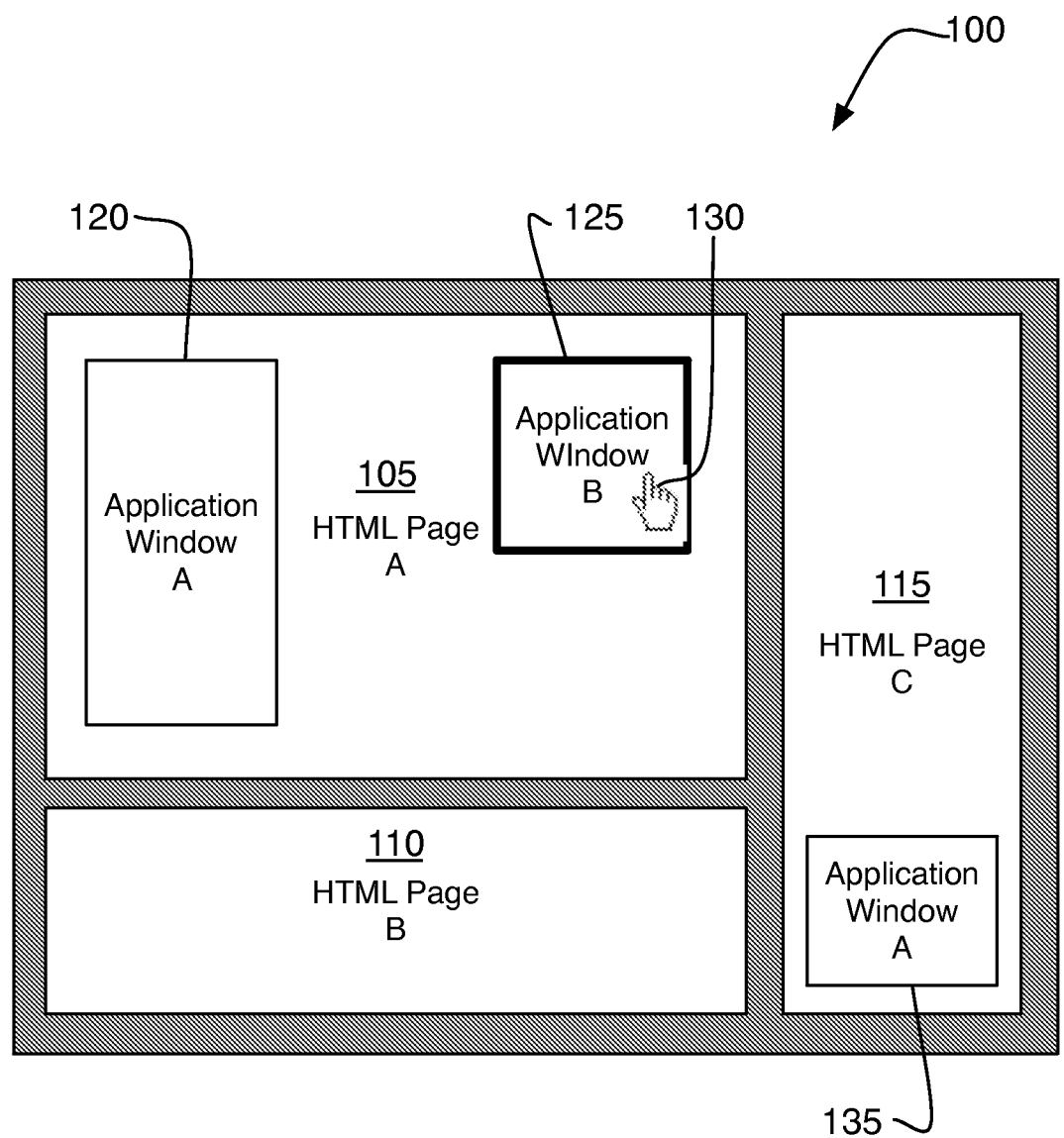
FIG. 4 is a schematic view of an embodiment of a client, illustrating the client display with the peripheral device selecting application B, embedded in hypertext markup language (HTML) page A.

FIG. 4 shows a schematic view 100 of an example of a client display with multiple HTML pages including embedded applications represented by their respective windows. HTML page A 105 includes an application A window 120 and an application B window 125. Application B is selected by positioning the cursor 130 within the application B window 125. HTML page B 110 lacks an embedded application window, and HTML page C 115 has application A window 135. Both the application A window 120 and application A window 135 can be used to select a single shared application A. For example, multiple application windows, as shown by application window A 120 and application window A 135, can select a single Firefox™ web browser application. In contrast, the Mozilla™ web browser application requires a separate copy of the application for each Mozilla™ application window, as shown in application window B 125.

Figure 5:
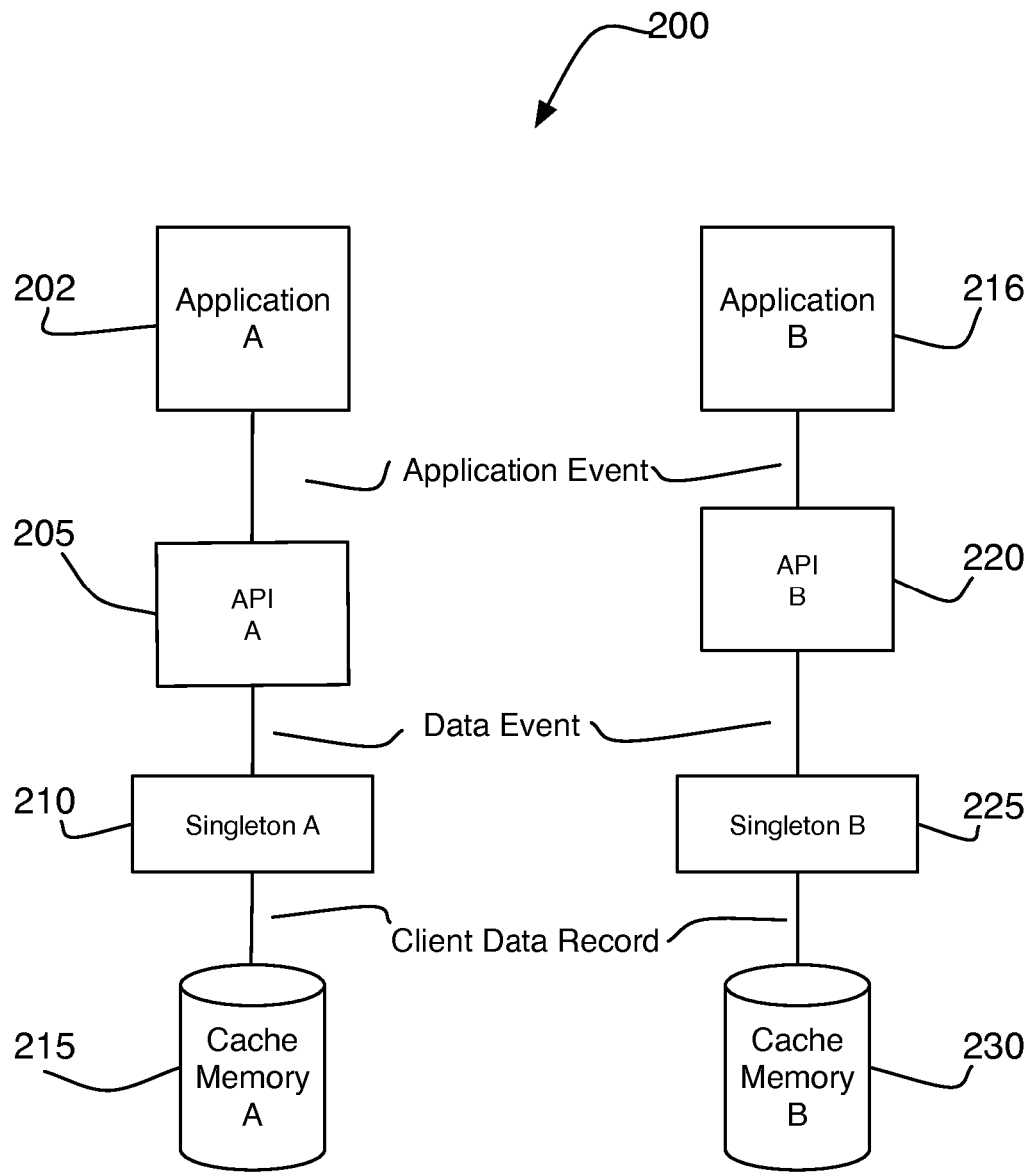
FIG. 5 is a block diagram of an embodiment of a client, including an application A, an application B, and their respective application programming interfaces, singletons, and cache memories.

FIG. 5 shows a block diagram 200 illustrating an application A 202 with corresponding API A 205, singleton A 210, and cache memory A 215. For example, application A can be the Firefox™ application. Application B 216 also has a corresponding API B 220, a singleton B 225, and a cache memory B 230. For example, application B can be the Mozilla™ application.

A singleton is a single programmatic object that can be shared by multiple users of a single application, by virtue of the singleton's global parameters. A singleton facilitates coordination of multiple objects, such as applications that interact with the user's display and pointer, or applications that perform memory write or read operations.

Where multiple applications are running on a single client, as shown in FIG. 5, the cache memory 24 shown in FIG. 2 can be partitioned into separate virtual cache memories, with each application having its own cache memory. For example, with further reference to FIG. 5, application A 202 can have its own cache memory A 215, and application B 216 can have its own cache memory B 230. Alternatively, a memory management system can be used to either statically or dynamically allocate one or more cache memories with capacity determined by the respective requirements of application A 202 and application B 216.

Monitoring of a client system uses a singleton, which is generated the first time an application is invoked. For example if application A 202 was invoked for the first time, then the script file contained in the application file set, received from the server 40, would create singleton A 210.

More specifically, when a peripheral device, a mouse for example, moves a cursor to a location on the client display, the client is prompted to request an application from the server. In one embodiment, the user can be required to press a mouse button while the cursor is within a particular area of the display, corresponding to an application. Alternatively, simply moving the cursor into a particular area without further action can prompt the client 20 to request an application file set from the server 40. For example, application A 202 is invoked by positioning the cursor 130 in application window A 120 in FIG. 4.

In response, the server 40 sends an application file set to the client 20. The application file set includes a scripting language file, or "script", which first checks on the client for the existence of a singleton corresponding to the application in the application file set. If the singleton does not exist, the script creates the singleton. In one embodiment, the scripting language is JavaScript™. Alternative embodiments include scripting languages such as VBScript™, or PerlScript™ for example.

The singleton uses an API to monitor events generated by an application running on a client. An API is an interface between an application and a variety of services commonly used with the application. The API performs much of the setup and connection work between the application and a service—a singleton for instance. Use of an API reduces the complexity of an application, which is beneficial for applications running on a client with minimal memory storage.

Subsequently, if application A 202 is invoked a second time by placing cursor 130 in application window A 135 in FIG. 4, a new application file set is received by the server 40, the script checks for the existence of singleton A 410 and need not create a second copy of singleton A 210. The application window A 120 and application window A 135 each use the application A 202 and API A 205 received by the client 20 in response to the cursor 130 being placed in application window 120. In addition, the application window A 120 and application window A 135 each use the singleton A 210 generated by the script in application file set received as a result of cursor 130 being placed in application window 120.

An event represents a temporal change in the application based on interrupts or on polling the application on a periodic basis where a timer generates a periodic interrupt. Non-limiting examples of a temporal change include a new data result due to the application computing an algorithm, or responding to a change in application inputs, or even a change based on an internal timer.

The monitoring of the client system can entail tracing or logging. Tracing is considered an active process where every event and relevant data is captured. Tracing can be used to single-step through an application to recreate the conditions preceding an error manifested in an application. Logging is considered a passive process, where captured events typically represent the final result of a program execution, but not all of the intermediate events generated during the execution. A non-limiting example of logging is reporting the results of a completed virus scan.

When an event is monitored, the singleton captures the event by writing a copy of the event, herein called a client data record, to the client's cache memory. For example, in FIG. 5 Application A 202 can generate an event corresponding to a numeric change in a register. API A 205 transforms the generated event, herein called an application event, into an application independent format, herein called a data event. The singleton A 210 detects the data event and conditionally writes corresponding information to the cache memory A 215, herein called a client data record. The conditional write by the singleton depends on a variety of settings, one of which is whether tracing or logging is enabled. The cache memory capacity is typically inadequate for storing a sufficient number of events to reconstruct the steps preceding an application error. In one embodiment, the singleton performs the operation of writing to the cache memory. Alternatively, the singleton can also instruct another object to perform the write operation to the cache memory.

Figure 6:
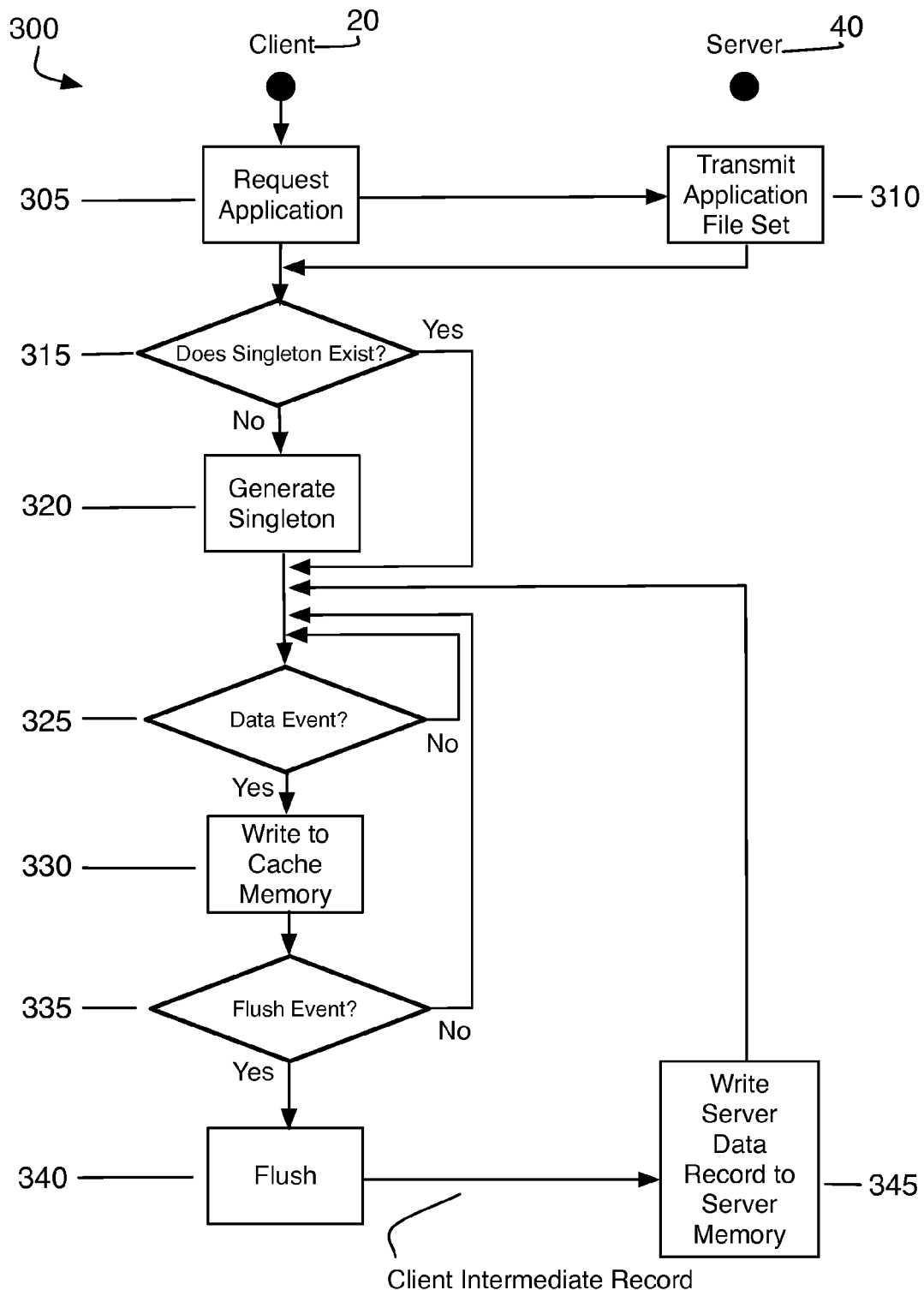
FIG. 6 is a flowchart representation of an embodiment of a process used to debug client-side application code, illustrating the monitoring and persisting of client-side generated data events.

FIG. 6 shows an embodiment of a process 300 of the monitoring and persisting steps used to debug client-side code. In response to input from a peripheral device, such as a mouse 26, the client 20 requests an application from the server 40 at step 305. The server 40 responds to the request, by transmitting an application file set, to the client 20 at step 310. A script file in the application file set checks for the absence of a singleton object that is specific to that application at step 315. If the application-specific singleton does not already exist, the script generates one at step 320. The singleton monitors the activity of an API, while the API monitors the activity of the application. When the API generates a data event at step 325, the singleton writes a client data record to the cache memory 24 (FIG. 2) at step 330. If a flush event occurs at step 335, the singleton executes a flush at step 340, otherwise the singleton returns to monitoring the activity of the API.

The limited capacity of the client's cache memory relative to the amount of data that can be required for tracing or logging requires a mechanism to transfer the client data records in the cache memory to a server that has greater memory capacity. The transfer of client data records from the cache memory occurs in response to a flush event. In one embodiment, the flush event occurs when the cache memory utilization reaches a predetermined threshold. When the cache memory is shared by multiple applications, each cache memory space associated with an application will have its own predetermined threshold. When the threshold is exceeded as a result of a cache memory write, the flush event at step 335 initiates the flush process at step 340.

In an alternate embodiment, the flush event at step 335 occurs after a predetermined time period elapses. In another embodiment, the flush event at step 335 occurs after a significant error event even if tracing or logging is not active. In another embodiment, the flush event at step 335 occurs upon termination of tracing or logging. The client is responsible for ensuring that the cache memory is not being written to while the flush process is executing. Alternatively, the flush process can suspend writes to the cache memory and allow a currently executed write to the cache memory to complete or be aborted. In the embodiment where an elapsed time period triggers a flush event, the time period can be defined by the client or by the server. Where the time period is defined by the server, the server requests the client to flush the cache memory by communicating with the client using an asynchronous JavaScript™ and XML call (AJAX). AJAX is a group of web development techniques that facilitates communication between the server and the client in a manner that minimally interferes with the display of the client. AJAX can also be implemented with technologies other than JavaScript™ or XML.

The flush process at step 340 causes the contents of the cache memory to be transmitted to the server where a large capacity memory is available. The transmission of the cache memory contents preferably uses a data interchange format called JavaScript™ object notation (JSON). Although JSON originally derived from JavaScript™, JSON need not require JavaScript™. JSON can be used with a variety of programming languages. Optionally, other data interchange formats can be used.

The flush process at step 340 causes the client 20 to access the client data records from the cache memory 24 and to transmit the client data records to the server 40. The client data records are transmitted in an application independent format, using a data interchange format. The client data records are encoded on the client 20 transmitted to the server 40, then decoded on the server 40, and written to the server memory 44 at step 345. Both the encoding and decoding use the same data interchange format. After, the singleton returns to monitoring the activity of the API.

Typically, an unanticipated event, or sequence of events, occurs on the client-side that can lead to erroneous or unanticipated results. For example, the user of the client can make an unconscious keystroke, the application can been designed without properly anticipating a unique combination of events, or without properly anticipating an interaction with another application. In a typical embodiment, the event-tracing mode is enabled by default, so the user of the client can reproduce the events preceding the erroneous or unanticipated results to perform a causal analysis. Alternatively, a system administrator can view the results stored on the server to perform the same causal analysis. The preceding events, whether based on active tracing or passive logging, can be reconstructed on the client side, by recalling the client-generated data from the server. Although limited analysis of the data can be performed with the same data on the server, it is advantageous to reconstruct the events on the client, because there can also be interaction of the events with the client itself.

The recall process begins with a recall event, which is typically initiated by the user of the client, but can also be initiated from other sources, for example a system administrator. The recall event sends a request from the client to the server for one or more server data files, corresponding to the client data records previously stored in the client's cache memory that were transferred to the server as a result of one or more flush events. In one embodiment, the user of the client is responsible for ensuring future cache memory writes or flush events do not occur during the data recall from the server. In another embodiment, the recall event can suspend future client cache memory writes, and allow an existing cache memory write to either complete or be aborted. In still another embodiment, the recall event can also suspend future flush events, and allow an existing flush to complete or be aborted.

After the server has received a request from the client for one or more server data records, the server encodes one or more server data records with a data interchange format. The data interchange format is typically the same format used to transmit the client-originated data to the server during one or more flush processes. In one embodiment, the data interchange format is JSON. Typically, where the client requests more than one server data record, the server data records are sequential in time, transferred on either a first-in-first-out basis (FIFO), or a last-in-first-out (LIFO) basis. The server then encodes the one or more server data records to create return intermediate records, which are then transmitted to the client. The client then decodes the one or more return intermediate records using the same data interchange format used by the server for encoding the same files, thereby creating client return data records, which are substantially equivalent to the client data records that were transferred by the client to the server for persistent storage. The client then writes the one or more client return data records to the client's cache memory, where they can be accessed by other client applications. Typically, the client return data records are accessed by the corresponding application from which it originated, but the file can also be accessed by a viewing object or other debugging applications. In one embodiment, a data record pointer is incremented following receipt of the data records by the client. This allows the client to make subsequent recall requests for additional server data records, typically when a longer sequence of events is required to debug a problem properly. Although typically the client for each recall event recalls one server data record, the client can recall multiple server data records in one recall event where the available cache memory has increased. For example, this can occur where multiple applications have shared a single physical cache memory utilizing a dynamic memory allocation process, during the monitoring of the multiple applications, but a subsequent recall is requested for a single application only.

Figure 7:
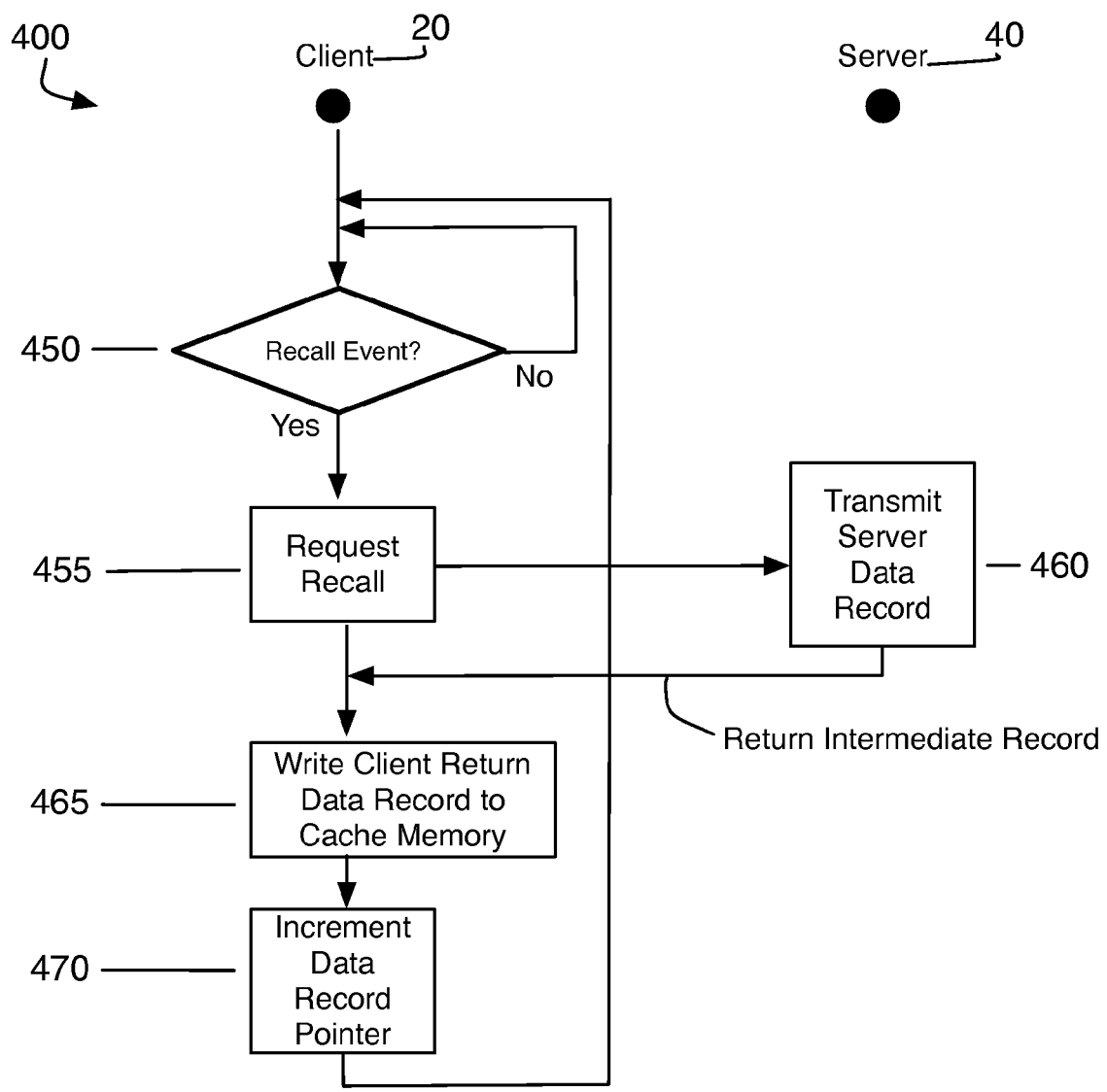
FIG. 7 is a flowchart representation of an embodiment of a process used to debug client-side application code, illustrating the recall of previously persisted client-side generated data events.

FIG. 7 shows an embodiment of a process 400 of the recall step used to debug client-side code. In response to a recall event at step 450, a recall is requested at step 455. In response to the recall request at step 455 from the client 20, the server 40 transmits one or more server data records at step 460 to the client 20. The data are transmitted in an application independent format, using a data interchange format. The server data records are encoded on the server 40 and transmitted to the client 20, then decoded on the client 20, and written to the cache memory 24 at step 465. The encoding and decoding use the same data interchange format. A data record pointer is then incremented at step 470, and the singleton returns to monitor subsequent recall events at step 450.

The aforementioned processes describe an embodiment with one or more applications running on a single client with data persisted on a single server. Alternatively, multiple clients can share a single application server, or the multiple applications on a single client can persist data on multiple application servers. The application server can be the same server described in the aforementioned processes, or alternatively a multitude of application servers can communicate with one or more web servers. After a flush event, the web server transacts with the application server to obtain a copy of the server data records, or to transfer the server data records entirely from the application server to the web server. After a recall event, the client transacts with either the application server, as described in the aforementioned processes, or alternatively the application server requests a copy or a transfer of the client requested server data record from the web server prior to transmitting the server data record to the client.

The behavior of the client-side debugging is defined by settings in the application file set, the settings being preset by the server, and capable of modification by the client. A non-exhaustive list of settings includes selection of tracing or logging, deactivating client monitoring, defining the level of tracing or what type of events and data to include in a trace, defining the cache memory size, defining the period after which the cache memory should be flushed, and enabling trace. These settings can be defined in a separate file contained in the application file set, or can be included in one or more of the files which comprise the application file set. For example, the API as shown in FIG. 5 can include settings to define which application event will result in a data event, or the script file that generates the singleton can include settings to define which data events the generated singleton will respond to.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for debugging client-side code comprising:
receiving, by a client, an application file set from a server in response to a request from the client for an application;
generating a singleton on the client by executing a script in the application file set received from the server;
monitoring, by the singleton, a data event generated by an application programming interface;
writing, by the singleton, a client data record to a cache memory in response to the application programming interface generating the data event, the client data record recording an application event of the application on the client; and
flushing, by the singleton, a contents of the cache memory in response to a flush event and transferring the contents to the server for persistent storage thereat, wherein the flushing comprises encoding by the client the contents with a data interchange format, transferring the contents to the server, decoding by the server the contents with the data interchange format, writing the contents to the server memory, and clearing the cache memory.

2. The method of claim 1 further comprising recalling, by the client, in response to a recall event, a portion of the contents of the server memory previously transferred to the server, encoding by the server the contents with a data interchange format, transferring the contents to the client, decoding by the client the contents with the data interchange format, writing by the client the contents to the cache memory, and incrementing by the client a data record pointer.

3. The method of claim 1 wherein an absence of an existing-singleton is detected before the singleton is generated.

4. The method of claim 1 further comprising a browser running on the client, the browser capable of running the script therein, the client in communication with the cache memory, the client in communication with the server, the server containing the application file set including a mark-up language file, the script, the application programming interface, and the application.

5. The method of claim 1 wherein the singleton is controllable by a one or more monitoring settings, the one or more monitoring settings being defined by a one or more files in the application file set, and the one or more monitoring settings being alterable by the client.

6. The method of claim 1 wherein the server is one of a plurality of application servers, the plurality of application servers being in communication with a web server, the contents of the cache memory further transferred from the one of the application servers to the web server, the web server storing the contents in a web server memory, and the web server transferring the contents to the one of the application servers in response to a recall event.

7. The method of claim 1 wherein the flush event occurs when the cache memory is full.

8. The method of claim 1 wherein the flush event occurs when a period of time has elapsed since a last flush event.

9. A non-transitory computer readable medium comprising computer program product for persisting a client-side generated event, the computer program product comprising:
a computer readable storage medium, which is not a signal, having computer readable program code embodied therewith, the computer readable program code comprising:
computer readable program code configured to provide an application file set from a server to a client in response to a request from the client for an application;
computer readable program code configured to generate a singleton on the client by executing a script in the application file set received from the server;
computer readable program code configured to monitor, by the singleton, a data event generated by an application programming interface;
computer readable program code configured to write, by the singleton, a client data record to a cache memory in response to the application programming interface generating the data event, the client data record recording an application event of the application on the client; and computer readable program code configured to flush, by the singleton, a contents of the cache memory in response to a flush event and transfer the contents to the server for persistent storage thereat, wherein the flushing comprises encoding by the client the contents with a data interchange format, transferring the contents to the server, decoding by the server the contents with the data interchange format, writing the contents to a server memory, and clearing the cache memory.

10. The computer program product of claim 9 wherein the computer readable program code further comprises computer readable program code configured to enable receipt of contents of a cache memory by the server.

11. The computer program product of claim 10 wherein the contents are decoded by the server with a data interchange format.

12. A method for monitoring client-side code comprising:
receiving, by a client, an application file set from a server in response to a request from the client for an application;
generating a singleton on the client by executing a script in the application file set received from the server;
monitoring, by the singleton, a data event generated by an application programming interface; and
writing, by the singleton, a client data record to a cache memory in response to the application programming interface generating the data event, the client data record recording an application event of the application on the client,
wherein the server is one of a plurality of application servers, the plurality of application servers being in communication with a web server, the contents of the cache memory further transferred from the one of the application servers to the web server, the web server storing the contents in a web server memory, and the web server transferring the contents to the one of the application servers in response to a recall even.

13. The method of claim 12 wherein an absence of an existing-singleton is detected before the singleton is generated.

14. The method of claim 12 further comprising a browser running on the client, the browser capable of running the script therein, the client in communication with the cache memory, the client in communication with the server, the server containing the application file set set including a markup language file, the script, the application programming interface, and the application.

15. The method of claim 12 wherein the singleton is controllable by a one or more monitoring settings, the one or more monitoring settings being defined by a one or more files in the application file set, and the one or more monitoring settings being alterable by the client.

16. The method of claim 12 further comprising flushing, by the singleton, a contents of the cache memory in response to a flush event and transferring the contents to the server for persistent storage thereat.

17. A method for debugging client-side code comprising:
receiving, by a client, an application file set from a server in response to a request from the client for an application;
generating a singleton on the client by executing a script in the application file set received from the server;
monitoring, by the singleton, a data event generated by an application programming interface;
writing, by the singleton, a client data record to a cache memory in response to the application programming interface generating the data event, the client data record recording an application event of the application on the client;
flushing, by the singleton, a contents of the cache memory in response to a flush event and transferring the contents to the server for persistent storage thereat; and
recalling, by the client, in response to a recall event, a portion of the contents of the server memory previously transferred to the server, encoding by the server the contents with a data interchange format, transferring the contents to the client, decoding by the client the contents with the data interchange format, writing by the client the contents to the cache memory, and incrementing by the client a data record pointer.

18. A method for debugging client-side code comprising:
receiving, by a client, an application file set from a server in response to a request from the client for an application;
generating a singleton on the client by executing a script in the application file set received from the server;
monitoring, by the singleton, a data event generated by an application programming interface;
writing, by the singleton, a client data record to a cache memory in response to the application programming interface generating the data event, the client data record recording an application event of the application on the client; and
flushing, by the singleton, a contents of the cache memory in response to a flush event and transferring the contents to the server for persistent storage thereat,
wherein the server is one of a plurality of application servers, the plurality of application servers being in communication with a web server, the contents of the cache memory further transferred from the one of the application servers to the web server, the web server storing the contents in a web server memory, and the web server transferring the contents to the one of the application servers in response to a recall event.

* * * * *